United States Patent Office 3,221,045
Patented Nov. 30, 1965

3,221,045
PREPARATION OF OLEFINIC ESTERS
James E. McKeon and Paul S. Starcher, Charleston, W. Va., assignors to Union Carbide Corporation, a corporation of New York
No Drawing. Filed Mar. 26, 1962, Ser. No. 182,688
7 Claims. (Cl. 260—497)

This invention relates to the preparation of olefinic esters. In one aspect, the invention relates to a process for the preparation of alpha-olefinic esters of monocarboxylic acids. In another aspect, the invention relates to a catalytic process for the production of alpha-olefinic esters of monocarboxylic acids whereby the initial reaction, i.e., alkenylation reaction, and/or the subsequent catalyst regeneration reaction is effected in the presence of oxygen thus extending the activity of the catalyst for extremely long periods of time. In a further aspect, the invention relates to carrying out the aforesaid catalytic process in an essentially halide ion free system. In a still further aspect, the invention is directed to the aforesaid catalytic process which process affords several unexpected advantages by effecting same in the presence of an inert normally liquid organic medium. In various other aspects, the invention is directed to novel compositions.

In a broad aspect, the novel process involves contacting an olefinic compound with a monocarboxylic acid in the presence of a catalyst, e.g., Pd(II), a catalytic cooxidant, e.g., Cu(II), which functions to maintain the catalyst in its catalytically active state of oxidation, and sufficient oxygen which functions to regenerate the catalytic cooxidant from a lower state of oxidation, e.g., Cu(I), to a higher state of oxidation, e.g., Cu(II), thereby producing the alpha-olefinic ester of monocarboxylic acid as the desired product. In view of practical, commercial, and economic expediencies, it is extremely advantageous and desirable to effect the aforesaid process in the presence of additional monocarboxylic acid anion, that is to say, the process is conducted in the presence of an amount of monocarboxylic acid anion which exceeds the anion concentration of the monocarboxylic acid reagent in the reaction medium. By virtue of the novel process hereinafter described, there is provided a catalytic process in which the catalytic species, e.g., Pd(II), is continuously regenerated in situ for an indefinite period of time. This profound advantage becomes especially marked and pronounced when the novel process is conducted as a homogeneous liquid phase reaction.

The olefinic compounds which are contemplated as reagents in the novel process are free from acetylenic unsaturation and contain at least one free hydrogen atom bonded to each ethylenic carbon atom of at least one ethylenic group therein, i.e., $>C=C<$. Olefinic compounds which are desirable in the novel process can be characterized by the following formula:

I 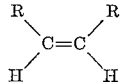

wherein each R, individually, can be hydrogen or a monovalent hydrocarbon radical free from acetylenic unsaturation, e.g., alkyl, cycloalkyl, alkenyl, cycloalkenyl, aryl, aralkyl, alkaryl, and the like. In addition, both R variables together with the ethylenic carbon atoms of Formula I supra can represent a cycloaliphatic hydrocarbon nucleus which contains from 5 to 12 carbon atoms in said nucleus, preferably from 5 to 8 carbon atoms, e.g., a nucleus derived from cyclopentene, cyclohexene, cycloheptene, cyclooctene, cyclododecene, and the like.

Illustrative R variables include, for example, hydrogen, methyl, ethyl, n-propyl, isopropyl, n-butyl, isobutyl, sec-butyl, the pentyls, the hexyls, the heptyls, the octyls, the dodecyls, the octadecyls, vinyl, allyl, 1-propenyl, 1-butenyl, 2-butenyl, 3-butenyl, the hexenyls, the octenyls, cyclopentyl, cyclohexyl, cycloheptyl, cyclohexenyl, phenyl, tolyl, xylyl, ethylphenyl, propylphenyl, benzyl, phenethyl, phenylpropyl, phenylbutyl, and the like.

Exemplary olefinic compounds include, by way of illustrations, ethylene, propylene, 1-butene, 2-butene, 1-pentene, 2-pentene, 1-hexene, 2-hexene, 3-hexene, 1-heptene, 2-heptene, 3-heptene, the octenes, the decenes, the dodecenes, the octadecenes, cyclopentene, cyclohexene, cycloheptene, cyclooctene, cyclododecene, lower alkyl substituted cyclopentene, lower alkyl substituted cyclohexene, lower alkyl substituted cycloheptene, butadiene, 1,3-pentadiene, isoprene, 1,3-hexadiene, 1,5-hexadiene, the heptadienes, 1,7-octadiene, the dodecadienes, 4-vinylcyclohexene, vinylcyclohexane, allylcyclohexane, vinylcyclopentane, styrene, 3-phenylpropene-1, 4-phenylbutene-1, bicyclo[4.3.0]nona-3,7-diene, the methyl substituted styrenes, the ethyl substituted styrenes, and the like. Preferred olefinic compounds include the alkenes especially those which have from 2 to 8 carbon atoms; the alkadienes especially those which have from 4 to 8 carbon atoms; the cycloalkenes especially those which have from 5 to 6 carbon atoms in the cycloalkenyl nucleus; the vinylcycloalkanes especially those which have from 5 to 6 carbon atoms in the cycloalkyl nucleus; the α-alkenylbenzenes especially those which have from 2 to 4 carbon atoms in the α-alkenyl moiety thereof; and the like. Highly preferred olefinic compounds include ethylene, propylene, 1-butene, 2-butene, butadiene, isoprene, cyclohexene, 4-vinylcyclohexene, and styrene. Ethylene is most preferred.

It is pointed out at this time that by the term "lower alkyl," as used herein including the appended claims, is meant a monovalent saturated aliphatic hydrocarbon radical which contains from 1 to 4 carbon atoms, e.g., methyl, ethyl, isopropyl, sec-butyl, and the like.

The monocarboxylic acids which are contemplated in the novel process contain one carboxy group, i.e., —COOH, and are free from actetylenic unsaturation (—C≡C). Those monocarboxylic acids which consist solely of carbon, hydrogen, and oxygen atoms, said oxygen being present in the form of an ester group, i.e.,

are desirable. The saturated hydrocarbon monocarboxylic acids are preferred. Illustrative examples of monocarboxylic acids include the alkanoic acids such as formic, acid, acetic acid, propionic acid, butyric acid, valeric acid, hexanoic acid, heptanoic acid, decanoic acid, dodecanoic acid, and the like; the cycloalkanecarboxylic acids, e.g., cyclohexanecarboxylic acid, cyclopentanecarboxylic acid, and the like; benzoic acid; naphthoic acid; phenylacetic acid; and the like. The alkanoic acids which have from 1 to 10 carbon atoms, and the cycloalkanecarboxylic acids which have from 5 to 6 carbon atoms in the cycloalkane nucleus, are preferred. Formic acid, acetic acid, and propionic acid are highly preferred with acetic acid being especially preferred.

The alkenylation reaction can be conducted over a wide temperature range and pressure range. The selection of the operative pressure and operative temperature for optimum results will depend upon various factors such as the nature of the olefinic reagent, the nature of the monocarboxylic acid reagent, the concentration of the reagents, the use of an inert normally-liquid organic vehicle, the source and concentration of the monocarboxylic acid anion, the equipment employed, and the like. Broadly, the reaction temperature can be as low as 0° C., and lower, and as high as 225° C., and higher. A suitable temperature range is from about 20° C. to about 200° C. In general, the reaction proceeds favorably at an elevated temperature. A reaction temperature in the range of from about 50° C. to about 160° C. is preferred. It has been observed that eminent results are obtained by conducting the reaction at a temperature in the range of from about 70° C. to about 130° C. The operative pressure, also, can be varied over a wide range, e.g., from slightly below atmospheric pressure to super-atmospheric pressures. In general, it is desirable to employ a total pressure which is at least equal to one atmosphere. It is preferred, however, that the total pressure be slightly greater than one atmosphere and as high as 300 atmospheres, and higher. A total pressure up to about 100 atmospheres is highly preferred.

The alkenylation reaction can be effected for a period of time which ranges from several seconds to several hours depending upon the correlation of factors noted previously, for example, from less than one minute to about 10 hours, and longer.

The alkenylation reaction can be accomplished in the vapor phase or liquid phase over a fixed catalyst bed, or alternatively, it can be conducted as a homogeneous liquid phase reaction. The homogeneous liquid phase reaction is extremely preferred. It is highly desirable to effect the alkenylation reaction in the essential absence of impurities which tend to inactivate the catalyst. It, also, is highly preferred to employ an essentially anhydrous feed mixture. The alkenylation reaction, initially, should be conducted in an essentially anhydrous medium, preferably in an essentially anhydrous homogeneous liquid phase medium, for example, in a medium containing less than about 3 weight percent water. Outstanding conversions and yields are obtained when the alkenylation reaction is effected in the presence of less than about one weight percent water, and preferably still, in the presence of less than about 0.5 weight percent water.

The catalyst, e.g., Pd(II), is employed in catalytically significant quantities. When effecting the novel process as a homogeneous liquid phase reaction, a catalyst concentration in the range of from about 0.0001 weight percent, and lower, to about 5 weight percent, and higher, calculated as Pd(II), based on the total weight of the monocarboxylic acid reagent and inert normally-liquid organic vehicle, if any, is suitable. A catalyst concentration in the range of from about 0.001 to about 1.0 weight percent, calculated as Pd(II), is preferred. For optimum results, the nature of the reagents, the operative conditions under which the alkenylation reaction is conducted, the solvent characteristics of the monocarboxylic acid (and inert normally-liquid organic, if employed), and other factors, will largely determine the desired catalyst concentration. The source of the active catalyst species, e.g., Pd(II), can be derived from a palladium compound which is soluble in the reaction medium (monocarboxylic acid reagent, catalytic co-oxidant, etc.) or which can become soluble therein by reaction with one of the components of said medium. Moreover, the palladium must be substantially present in said medium in its Pd(II) oxidation state and be capable of forming a complex with the olefinic reagent. Illustrative palladium compounds include palladous acylate, the anion of which preferably corresponds to the anion of the monocarboxylic acid reagent, for example, the palladous alkanoates, e.g., palladous formate, palladous acetate, palladous propionate, palladous butyrate, palladous hexanoate, and the like; the palladous cycloalkanecarboxylates, e.g., palladous cyclohexanecarboxylate, and the like; coordinate complexes of palladium with ligands, one or more of which can be displaced by the olefinic reagent to form a palladium-olefin complex, e.g., Pd(II) acetylacetonate, Pd(II) dibenzonitrile dichloride, and the like; palladous dichloride; palladium metal (which oxidizes in the reaction medium to Pd(II)); the Pd(IV) compounds which are reduced in the reaction medium; palladium-olefinic complexes, the olefinic moiety of which preferably corresponds to the olefinic reagent; and the like.

The alkenylation reaction is effected in the presence of sufficient oxygen to essentially prevent the deposition of metal which results from the reduction of the catalytic cation, for example, to essentially prevent the deposition of Pd(O) resulting from the reduction of Pd(II), and further to essentially prevent the deposition of metal resulting from the reduction of the catalytic co-oxident. Expressed in another way, the alkenylation reaction is conducted in the presence of oxygen which is at least sufficient to maintain the ratio of the catalytic co-oxidant in its higher oxidation state to the catalytic co-oxidant in its lower oxidation state, e.g., Cu(II)/Cu(I), at a level such that the Cu(II)/Cu(I) couple is capable of converting Pd(O) to Pd(II) at a rate which maintains a catalytically significant concentration of Pd(II) and which essentially prevents deposition of Pd(O). This factor, i.e., whether or not the alkenylation reaction is being effected in the presence of sufficient oxygen, is readily ascertained by an operator who can routinely and periodically withdraw samples of the reaction product mixture and analyze same for Pd(O) and/or Cu(II). As a practical matter, the concentration of oxygen is a function of the operative pressure, operative temperature, and the like. In addition, factors such as residence time, the equipment used, safety factors to be observed, and the like, can impose practical considerations. By way of an illustration, should ethylene be the olefinic reagent, caution should be exercized, for example, in the recovery of the unreacted ethylene so as not to build up to a potentially explosive mixture by virtue of the concentration of oxygen therein. Moreover, to avoid additional separation and recovery procedures, it is highly desirable to introduce an oxygen-rich gas to the system. For obvious economic and commercial reasons, a substantially pure oxygen feed, e.g., a gas containing at least 90 volume percent oxygen, is preferred. The introduction of essentially pure oxygen into the system is highly preferred. The introduction of oxygen or oxygen contained in an otherwise inert gaseous medium is preferably effected in such a manner to insure intimate contact with the liquid phase. Other means of oxidizing the reduced catalytic co-oxidant, e.g., Cu(I), to its higher oxidation state, e.g., Cu(II), may be employed, for example, oxides of nitrogen, e.g., $N_2O_4$; peroxides which contain the —O—O— bond, e.g., peracetic acid; and the like.

The concentration of the catalytic co-oxidant can be varied over an extremely wide range. For example, the molar ratio of Cu(II) to Pd(II) can vary from at least about 0.5 and upwards to several thousand. It is desirable to have a molar ratio of Cu(II) to Pd(II) greater than one, and preferably significantly greater than one, e.g., greater than 10 and upwards to 100, and higher. For practical and optimum results, it is highly desirable to achieve at least the maximum solubility of Cu(II) in the homogeneous liquid phase (monocarboxylic acid, inert normally-liquid organic vehicle, etc.), and often times to exceed said maximum solubility thereby conducting the alkenylation reaction in the presence of a slurry of Cu(II) salt which acts as a reservoir of co-oxidant. The source of the catalytic co-oxidant, e.g., Cu(II), can be readily obtained from cupric acylate or cupric ammonium acylate, the anion of which preferably corresponds to the anion of the monocarboxylic acid reagent, e.g., the cupric alkanoates and the cupric ammonium alkanoates, e.g., cupric formate, cupric acetate, cupric propionate, cupric butyrate, cupric ammonium acetate, cupric ammonium propionate, and the like; the cupric cycloalkanecarboxylates, e.g., cupric cyclohexylcarboxylate, and the like; various copper coordination complexes, e.g., Cu(II) acetylacetonate, and the like; various cupric salts which are soluble in the monocarboxylic acid reagent such as cupric chloride, cupric nitrate, etc., in acetic acid; copper compounds which can dissolve in the monocarboxylic acid reagent to give a soluble Cu(II) salt, e.g., cupric oxide, and the like. The cupric ion source, also, can be metallic copper or a cuprous compound which can be oxidized in situ in the reaction mixture.

The concentration of the olefinic compound will depend, to a significant degree, upon several variables. For the homogeneous liquid phase reaction, the solubility of the olefinic compounds which are gaseous under the operative conditions of the alkenylation reaction is proportional to the pressure, or expressed differently, the partial pressure of the gaseous olefinic compound above the liquid reaction mixture will directly affect the alkenylation reaction rate. Olefinic compounds which are liquid at the reaction temperature, at atmospheric pressure, are readily soluble in the liquid reaction mixture, and thus, the concentration of same can be varied over a wide range essentially independent of the operating pressure, as desired. In general, olefinic compound which is at least sufficient to maintain substantially all of the Pd(II) in the form of Pd(II)-olefin complex is desirable, though lesser amounts of olefinic compound can be employed with the possible disadvantage of a lower alkenylation reaction rate. The practical upper limit of the concentration of olefinic compound is that concentration which measurably decreases the solubility of inorganic components, e.g., catalytic co-oxidant, of the reaction mixture.

The interrelationships of the previously discussed variables, i.e., olefin concentration, oxygen concentration, catalytic co-oxidant, e.g., Cu(II), concentration, and the ratio of catalytic co-oxidant to catalyst, e.g., Cu(II) to Pd(II) can be better understood by a consideration of the following equations:

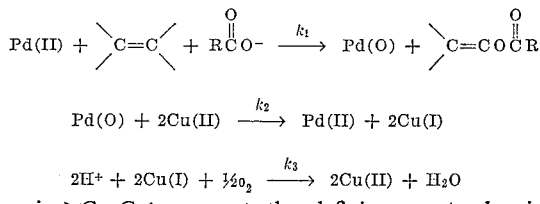

wherein $>C=C<$ represents the olefinic reagent, wherein

represents the monocarboxylic acid anion, wherein

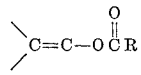

represent the alpha-olefinic ester product, and wherein $k_1$, $k_2$, and $k_3$ represent the reaction rate constants for their respective equations. Thus the concentration of oxygen can be maintained at a level such that $k_3>k_2>k_1$. This condition ($k_3>k_2>k_1$) represents an ideal situation. Practical considerations might lead to reaction conditions in which $k_2$ or $k_3$ would of necessity control the overall rate of the alkenylation reaction.

The monocarboxylic acid component of the reaction mixture is employed in large excess since said reagent functions both as a reactant and as a diluent. When no inert normally-liquid organic vehicle is employed, the homogeneous liquid phase contains a major amount, e.g., up to 95 weight percent, and more, of the monocarboxylic acid reagent. Of course, the weight percent of said monocarboxylic acid reagent diminishes accordingly should one desire to add thereto an inert normally liquid organic vehicle.

With reference to the monocarboxylic acid anion, the theoretical lower concentration limit of same would be that which is provided by the ionization of the monocarboxylic acid per se at the operative temperature of the alkenylation reaction. For example, for acetic acid the concentration of the acetate ion would be $3.9 \times 10^{-7}$ M at 25° C. An upper concentration limit of monocarboxylic acid anion of about 5 mols per liter of homogeneous liquid phase reaction mixture is suitable. A concentration in the range of from about $10^{-2}$ to about 2.0 mols of carboxylic acid anion per liter of homogeneous liquid phase reaction mixture is preferred; from about 0.1 to 1.0 mol per liter is highly preferred.

It is readily apparent from the preceding discussion that since the theoretical lower concentration limit of the monocarboxylic acid anion is equal to that which would be provided by the ionization of the monocarboxyl acid per se, another source of said anion is necessary in order to raise said lower limit to a concentration which will afford a more practical and commercial alkenylation reaction rate. In this respect, the additional anion concentration is provided by a soluble ionic monocarboxylate compound. For instance, a soluble ionic monocarboxylate compound can be added to the reaction medium, or it can be generated in situ by the reaction of a basic compound with the monocarboxylic acid reagent, providing that the neutralization product (from the reaction of said basic compound and said acid) does not interfere with the alkenylation reaction, or if said neutralization product does interfere it is capable of being readily removed from the reaction medium. The basic salts of a strong base and a weak acid, the metal portion of said salts being capable of forming a soluble monocarboxylate salt in the monocarboxylic acid reagent, are preferred for providing the additional monocarboxylic acid anion source. Illustrative basic salts include the alkali metal hydroxides and oxides, e.g., sodium hydroxide, potassium hydroxide, and the like; the Group II metal hydroxides, e.g., barium hydroxide, lead hydroxide, magnesium hydroxide, calcium hydroxide, and the like; the metal salts of monocarboxylic acids, the acid moiety of which corresponds, preferably, to the anion of the monocarboxylic acid reagent, e.g., the alkali metal monocarboxylates such as sodium acetate, potassium acetate, lithium acetate, potassium propionate, sodium propionate, and the like; the Group II metal monocarboxylates such as barium acetate, zinc acetate, magnesium acetate, cadmium acetate, zinc propionate, and the like; various other transition metal monocarboxylates such as cobalt acetate, nickel acetate, manganous acetate, and the like. Further illustrative basic compounds which are capable of providing the source or means of additional monocarboxylic acid anion include ammonia; the alkali metal carbonates and oxides, e.g., sodium carbonate, sodium oxide, potassium carbonate, potassium oxide, and the like; the ammonium monocarboxylates such as the ammonium alkanoates, e.g., ammonium acetate, ammonium propionate, and the like; the alkaline earth metal oxides and carbonates; the basic organic nitrogen compounds such as the trialkylamines, e.g., trimethylamine, triethylamine, and the like. Moreover, the additional monocarboxylic acid anion can be supplied by the monocarboxylate of the catalytic co-oxidant, or the monocarboxylate of the catalyst. For example, if acetic acid is the reagent, the source of additional acetate anion can be supplied by the acetate of the catalytic co-oxidant, e.g., cupric acetate, or the acetate of the catalyst, e.g., palladous acetate. Sodium acetate, potassium acetate, and ammonium acetate are especially preferred. In summary, the novel alkenylation reaction in highly practical, commercial, and preferred aspects, is conducted in the presence of an amount of monocarboxylic acid anion which exceeds the anion concentration furnished by the ionization of the monocarboxylic acid reagent under the operative conditions of the process.

The novel process can be executed in a batch, semi-continuous, or continuous fashion. The equipment can be fabricated of glass, metal, alloy, etc., to best suit the particular and individual needs of the design and contemplated operative conditions. One suitable manner for effecting the alkenylation reaction is to first prepare a homogeneous liquid medium comprising catalytic co-oxidant, e.g., Cu(II), monocarboxylic acid anion, e.g.,

and catalyst, e.g., Pd(II), contained in monocarboxylic acid, e.g., acetic acid. Under the desired operative conditions of temperature and pressure, the olefinic compound, e.g., ethylene, and oxygen, can be introduced either together, simultaneously, or separately into the homogeneous liquid phase reaction mixture. The alpha-olefinic ester product and water can be continuously removed from the reaction zone, followed by recovering the desired product therefrom via conventional procedures well known to the art. It is important to essentially avoid the build-up of water in the reaction zone since significant amounts of same can result in drastically lower yields of the alpha-olefinic ester product.

In a particularly preferred embodiment, the novel process is effected in the presence of an inert normally-liquid organic vehicle which is an organic polar compound capable of enhancing the solubility of the metal salts, especially the catalytic co-oxidant, e.g., Cu(II), in the homogeneous liquid reaction mixture. These vehicles, of course, are inert with respect to the reagents and product. This enhanced solubility serves to significantly increase the alkenylation reaction rate and also, to increase the productivity of the reaction system.

Illustrative inert normally-liquid organic vehicles include, for example, the hydrocarbon nitriles, e.g., acetonitrile, propionitrile, benzonitrile, and the like; the dialkyl sulfoxides, e.g., dimethyl sulfoxide, and the like; the cyclic sulfoxides, e.g., sulfolane, and the like; the N,N-dialkylalkanamides, e.g., N,N-dimethylacetamide, N,N-dimethylformamide, and the like; the dialkyl and cyclic carbonates, e.g., diethyl carbonate, ethylene carbonate, and the like; the aliphatic and cyclic ethers, e.g., tetrahydrofuran, dioxane, dimethyl ether of diethylene glycol, dimethyl ether of triethylene glycol, and the like; 2,4-pentanedione; ketodioxane; and the like.

In a second particularly preferred embodiment, the novel process is effected in a halide ion free, especially a chloride ion free, system, that is to say, in a system containing less than 10 parts per million (p.p.m.) of halide ion, and preferably less than 5 p.p.m. of halide ion. By operating the novel process in accordance with this embodiment, several pronounced advantages are obtained. From commercial standpoints, the novel process can be conducted with equipment constructed of, for example, stainless steel which otherwise would be readily attacked by relatively small amounts of halide ion. On the other hand, in order for a system to tolerate even a small amount of halide ion, one must resort to equipment fabricated from prohibitively expensive metals such as Hastelloy or titanium. In addition, a catalyst source such as palladous acylate, e.g., palladous acetate, or palladous acetylacetonate, palladous nitrate, etc., are relatively more soluble in the homogeneous liquid reaction mixture than would be the case with, for example, palladium dichloride. This can result in faster reaction rates and can increase the productivity of the reaction system. Moreover, the obvious commercial disadvantages which result because of the formation of halogenated organic by-products are eliminated in this embodiment. A further advantage which accrues is the relative increased solubility and stability of the catalytic co-oxidant in its lower oxidation state, e.g., cuprous acylate, as compared with, for example, cuprous chloride. The low solubility of cuprous chloride and its tendency to disproportionate to Cu(O) and Cu(II) limit the degree to which Cu(II) can be converted to Cu(I) in a chloride ion containing system. This limits the productivity of a halide containing catalyst solution.

Cuprous acylate in the halide free catalyst solution previously described is both freely soluble and stable toward disproportionation and therefore permits efficient use of the oxidizing power of the catalyst solution.

In a third particularly preferred embodiment, the novel process can be effected in two steps, namely (1) the alkenylation reaction, and (2) the regeneration reaction, both reactions preferably being effected in a halide ion free system. In the alkenylation reaction step, the olefinic compound is contacted with the monocarboxylic acid, additional monocarboxylic acid anion, the catalyst, e.g., Pd(II), and the catalytic co-oxidant, e.g., Cu(II), under the operative conditions noted previously, to produce the α-olefinic ester of said monocarboxylic acid as the product. The alkenylation reaction is initially commenced under essentially anhydrous conditions. It is preferred to first prepare a homogeneous liquid phase containing monocarboxylic acid, additional monocarboxylic acid anion, catalyst, and catalytic co-oxidant, and then contact said homogeneous liquid phase with the olefinic compound. Thereafter, the product, namely the α-olefinic ester of the monocarboxylic acid, and also, unreacted olefinic compound, if desired, are recovered from the reaction product mixture (which results from the alkenylation reaction) via conventional techniques, e.g., distillation under reduced pressure. The remainder or residue therefrom which contains some catalytic co-oxidant in the lower oxidation state, e.g., Cu(I), unreacted monocarboxylic acid, additional monocarboxylic acid anion, and perhaps some Pd(O), is contacted with sufficient oxygen to regenerate said catalytic co-oxidant from a lower state of oxidation, e.g., Cu(I), to a higher state of oxidation, e.g., Cu(II). In addition, Pd(O) likewise is oxidized to Pd(II). The water produced during this regeneration step is subsequently removed, e.g., by distillation. This regenerated mixture comprising unreacted monocarboxylic acid, additional monocarboxylic acid anion, Cu(II), and Pd(II) then is recycled to the alkenylation step with additional monocarboxylic acid being added thereto. An inert normally-liquid organic vehicle such as those exemplified previously can be employed during the alkenylation step and/or the regeneration step, as desired. However, the marked and pronounced advantages discussed supra which result from using a halide ion free system and an inert normally-liquid organic vehicle are obtained, also, in this two step embodiment.

In a fourth particularly preferred embodiment, the invention is directed to a novel process which comprises contacting an essentially anhydrous, halide ion free mixture containing the catalytic co-oxidant in a lower state of oxidation, e.g., Cu(I), the catalyst, e.g., Pd(II), and a monocarboxylic acid, with or without additional monocarboxylic acid anion, with sufficient oxygen to regenerate said Cu(I) to Cu(II). The practice of this embodiment affords a unique process for extending the catalytic life of said halide ion free mixture for an indefinite period of time. The water content resulting from the regeneration reaction is reduced until its concentration in the mixture is within the limits described previously, prior to using said mixture for the alkenylation reaction. It is preferred that the resulting essentially anhydrous mixture be a homogeneous liquid phase mixture.

In an extremely preferred aspect, the invention is directed to a novel composition containing a catalyst, e.g., Pd(II), and a catalytic co-oxidant, e.g., Cu(II), in a halide ion free liquid medium. The significance of the aforesaid novel composition cannot be overlooked since said composition, when employed in the novel processes, give many of the advantages discussed previously in detail. In a more preferred aspect, part or all of the liquid medium of the aforesaid novel composition is a monocarboxylic acid which is free from acetylenic unsaturation. In a still more preferred aspect, the preceding novel compositions are essentially anhydrous. In a yet more preferred aspect, the preceding novel compositions contain additional monocarboxylic acid anion. In addition, a still further preferred aspect of the invention is directed to the aforesaid novel compositions in which all or part of the liquid medium is an inert normally-liquid organic vehicle which is a polar compound capable of enhancing the solubility of Cu(II). The aforesaid novel compositions which are a homogeneous liquid phase are eminently preferred. These novel compositions, taken singly, or collectively, when employed in the novel processes discussed supra, give several or all of the advantages discussed throughout the specification. The scope and concentration of the catalyst, the catalytic co-oxidant, the monocarboxylic acid, the additional monocarboxylic acid anion, the inert normally-liquid organic vehicle, etc., have been illustrated previously.

Other metal species, in addition to Pd(II), are capable of catalyzing the alkenylation reaction. Such metals should possess an oxidation state in which the metal can form a coordination complex with olefins, and a second lower oxidation state which can be formed from the complex-forming state by the gain of two electrons. Suitable metals are to be found among the transition metals (the B groups of the Periodic Chart of the Elements, Second Cover, Merck Index, Sixth edition), for example, Ni, Ir, Au, Rh, Pt, Ru, and Hg.

The oxidation-reduction couple which serves as co-oxidant for the catalyst of the alkenylation reaction can be derived from metals other than copper. The requirements for such a couple are that in descending from its higher oxidation state to its lower oxidation state it is capable of oxidizing the reduced form of the catalyst, e.g., Pd(O), to its catalytically effective form (e.g., Pd(II)) and that it can be converted from its low oxidation state to its high oxidation state by reaction with oxygen, oxides of nitrogen, or similar oxidizing agents.

It is obvious that suitability of a given oxidation-reduction couple will depend on the catalyst, the solvent, and complex-forming compounds present in the reaction medium as well as other factors and therefor must, in general, be chosen by routine experiment from a group of potentially suitable metals. Such suitable metals are to be found among the transition metals (the B groups of the Periodic Chart of the Elements, Second Cover, Merck Index, Sixth edition) and may, under some conditions, include metals capable of acting as primary catalysts under other conditions. Examples of such potentially useful metals are: Fe, Cr, Au, Co, Rh, Ir, Ru, Ti, Ni, Pd, Pt, Mo, W, V, Mn, Os. Members of the lanthanide series such as cerium or mixtures of lanthanides are also potentially useful metals. The use of a mixture of two or more such metal couples may also be of value in obtaining the correct range of oxidizing potentials and also to increase the total concentration of co-oxidant.

The following examples are illustrative.

EXAMPLE 1

(A) to a 3-liter cylindrical glass bomb liner equipped with a thermowell, a 55/50 standard taper cap, and a small aperture, there were charged 36.22 grams of anhydrous cupric acetate, 19.62 grams of anhydrous potassium acetate, 1.77 grams of palladium (II) chloride, 500 grams of glacial acetic acid, and 40 grams of 2,5-pentanedione. The glass bomb liner and its contents were inserted into a high pressure cylindrical steel bomb equipped with gas inlet and outlet conduits and a thermocouple port. The bomb (and glass liner) then was purged with nitrogen, and heated to 120° C. under a nitrogen atmosphere, with agitation. Ethylene was charged into the bomb to 500 p.s.i.g., followed by agitating the contents of the bomb for a period of 5 hours. Thereafter, the bomb was cooled to below 35° C. and vented to atmospheric pressure. The bomb liner was removed, and the resulting reaction product mixture was found to contain a 74 percent yield of vinyl acetate (based on Cu(II) and Pd(II)) (as determined by vapor phase chromatography with reliable calibration). The bomb liner containing the reduced reaction product mixture including some metallic palladium therein was again inserted into the steel bomb, charged with air to 100 p.s.i.g., under agitation, for a period of 0.5 hour at 100° C. Upon examination, the resulting reaction product mixture contained no Pd(O). The cuprous salt had been converted to Cu(II) which was present as crystalline cupric acetylacetonate. The vinyl acetate content was essentially unchanged. Consequently, the reaction product mixture is recharged with ethylene to 500 p.s.i.g. at 110° C. to obtain additional vinyl acetate.

EXAMPLE 2

(A) To a 3-liter cylindrical glass bomb liner equipped with a thermowell, a 55/50 standard taper cap, and a small aperture, there were charged 36.22 grams of anhydrous cupric acetate, 19.62 grams of anhydrous potassium acetate, 1.07 grams of palladium metal powder, and 500 grams of glacial acetic acid. The glass bomb liner and its contents were inserted into a high pressure cylindrical steel bomb equipped with gas inlet and outlet conduits and a thermocouple port. The bomb (and glass liner) then was purged with nitrogen, and heated to 109° C. under a nitrogen atmosphere, with agitation. The bomb was agitated overnight in order to assure complete conversion of Pd(O) to Pd(II). Ethylene was charged into the bomb to 500 p.s.i.g., followed by agitating the contents of the bomb for a period of 1 hour. Thereafter, the bomb was cooled to below 35° C. and vented to atmospheric pressure. The bomb liner was removed, and the resulting reaction product mixture was found to contain a 92.5 percent yield of vinyl acetate (based on Cu(II) and Pd(II)) (as determined by vapor phase chromatography with reliable calibration). The bomb liner containing the reduced reaction product mixture including some metallic palladium therein is again inserted into the steel bomb, charged with air to 100 p.s.i.g., under agitation, for a period of 0.5 hour at 100° C. Upon examination, the resulting reaction product mixture contains no Pd(O). The cuprous salt is converted to Cu(II). The vinyl acetate content is essentially unchanged. Consequently, the reaction product mixture is recharged with ethylene to 500 p.s.i.g. at 110° C. to give a substantially increased yield of vinyl acetate.

EXAMPLE 3

(A) To a 3-liter cylindrical glass bomb liner equipped with a thermowell, a 55/50 standard taper cap, and a small aperture, there were charger 36.30 grams of anhydrous cupric acetate, 15.42 grams of anhydrous ammonium acetate, 1.77 grams of palladium (II) chloride, and 500 grams of 98–100% formic acid. The glass bomb liner and its contents were inserted into a high pressure cylindrical steel bomb equipped with gas inlet and outlet conduits and a thermocouple port. The bomb (and glass liner) then was purged with nitrogen, and heated to 50° C. under a nitrogen atmosphere, with agitation. Ethylene was charged into the bomb to 500 p.s.i.g., followed by agitating the contents of the bomb for a period of 1.5 hours. Thereafter, the bomb was cooled to below 35° C. and vented to atmospheric pressure. The bomb liner was removed, and the resulting reaction product mixture was found to contain a good yield of vinyl formate (as determined by vapor phase chromatography with reliable calibration). The bomb liner containing the reduced reaction product mixture is again inserted into the steel bomb, charged with air to 100 p.s.i.g., under agitation, for a period of 0.5 hour at 100° C. Upon examination, the resulting reaction product mixture contained no Pd(O). The cuprous salt is converted to Cu(II). Consequently, the reaction product mixture is recharged with ethylene to 500 p.s.i.g. at 110° C. to give a substantially increased yield of vinyl formate.

EXAMPLE 4

To a 3-liter cylindrical glass bomb liner equipped with a thermowell, a 55/50 standard taper cap, and a small aperture, were charged 42.0 grams of anhydrous copper propionate, 22.4 grams of potassium propionate, 1.77 grams of palladium dichloride and 500 grams of purified propionic acid. The glass bomb liner and its contents were inserted into a high pressure cylindrical steel bomb equipped with gas inlet and outlet conduits and a thermocouple port. The bomb (including glass liner and its contents) was then purged with nitrogen and heated to 110° C. under a nitrogen blanket with agitation. Ethylene was charged into the bomb to 150 p.s.i.g., and agitation was continued for 2 hours. Thereafter, the bomb was cooled to below 35° C. and vented to atmospheric pressure. The bomb liner was removed, and the resulting reaction product mixture was found to contain a good yield of vinyl propionate as determined by gas-liquid chromatography. The bomb liner containing the reduced reaction product mixture including some metallic palladium therein is reinserted into the steel bomb, charged with air to 100 p.s.i.g., under agitation, for a period of 0.5 hour at 100° C. Upon examination, the resulting reaction product mixture contains no Pd(O). The cuprous salt is converted to Cu(II). The vinyl propionate content is essentially unchanged. Consequently, the reaction product mixture is recharged with ethylene to 500 p.s.i.g. at 110° C. to give a substantially increased yield of vinyl propionate.

EXAMPLE 5

To a 3-liter cylindrical glass bomb liner equipped with a thermowell, a 55/50 standard taper cap, and a small aperture was charged 36.32 grams of anhydrous cupric acetate, 16.4 grams of anhydrous sodium acetate, 1.77 grams of palladium (II) chloride and 500 grams of glacial acetic acid. The glass bomb liner and its contents were inserted into a high pressure cylindrical steel bomb equipped with gas inlet and outlet conduits and a thermocouple port. The bomb (and glass liner was then purged with nitrogen and heated to 110° C. under a nitrogen atmosphere with agitation. Propylene was charged into the bomb to 125 p.s.i.g., and agitation was continued for a period of 1 hour. Thereafter, the bomb was cooled to below 35° C. and vented to atmospheric pressure. The bomb liner was removed, and the resulting reaction product mixture was found to contain 0.7 mole percent isopropenyl acetate (53 percent based on Cu(II) plus Pd(II) as determined by mass spectroscopy. The bomb liner containing the reduced reaction product mixture including some metallic palladium therein is again inserted into the steel bomb, charged with air to 100 p.s.i.g., with agitation, for a period of 0.5 hour at 100° C. Upon examination, the resulting reaction product mixture contains no Pd(O). The cuprous salt is converted to Cu(II). The isopropenyl acetate concentration is essentially unchanged. Consequently, the reaction product mixture is recharged with propylene to 150 p.s.i.g. at 110° C. to give a substantially increased yield of isopropenyl acetate.

EXAMPLE 6

To a 3-liter cylindrical glass bomb liner equiped with a 55/50 standard taper cap, a thermocouple well, and a small aperture, there were charged 36.32 grams of anhydrous cupric acetate, 19.62 grams of anhydrous potassium acetate, 1.77 grams of palladium dichloride and 500 grams of glacial acetic acid. The glass bomb liner and its contents were inserted into a high pressure cylindrical steel bomb equipped with gas inlet and outlet conduits and a thermocouple port. The bomb (and glass liner) was purged with nitrogen and heated to 110° C. under a nitrogen atmosphere with agitation. Ethylene was charged with the bomb to 150 p.s.i.g., followed by a charge of air for a total pressure of 200 p.s.i.g. The bomb and its contents were agitated for 2 hours and then cooled below 35° C. before venting to atmospheric pressure. The bomb liner was removed, and the resulting reaction product mixture was found to contain a 126 percent yield of vinyl acetate (as determined by vapor phase chromatography with reliable calibration), based on the original oxidizing capacity of Cu(II) plus Pd(II). That the yield of vinyl acetate was appreciably in excess of 100 percent based on the original copper (II) plus palladium(II) concentration and that there was an appreciable amount of copper(II) present at the termination of the reaction substantiates the continuous regeneration of copper(II) by oxygen.

EXAMPLE 7

To a 3-liter cylindrical glass bomb liner equipped with a thermowell, a 55/50 standard taper cap, and a small aperture, there were charged 36.22 grams of anhydrous cupric acetate, 19.62 grams of anhydrous potassium acetate, 1.77 grams of palladium(II) chloride, 400 grams of glacial acetic acid, and 100 grams of anhydrous dimethyl sulfoxide. The glass bomb liner and its contents were inserted into a high pressure cylindrical steel bomb equipped with gas inlet and outlet conduits and a thermocouple port. The bomb (and glass liner) then was purged with nitrogen, and heated to 110° C. under a nitrogen atmosphere, with agitation. Ethylene was charged into the bomb to 500 p.s.i.g., followed by agitating the contents of the bomb for a period of 1 hour. Thereafter, the bomb was cooled to below 35° C. and vented to atmospheric pressure. The bomb liner was removed, and the resulting reaction product mixture was found to contain a 70 percent yield of vinyl acetate (as determined by vapor phase chromatography with reliable calibration). The bomb liner containing the reduced reaction product mixture is again inserted into the steel bomb and charged with air to 100 p.s.i.g., under agitation, for a period of 0.5 hour at 100° C. Upon examination, the resulting reaction product mixture contains no Pd(O). The cuprous salt is converted to Cu(II). The vinyl acetate content is essentially unchanged. Consequently, the reaction product mixture is recharged with ethylene to 500 p.s.i.g., at 100° C. to give a substantially increased yield of vinyl acetate.

EXAMPLE 8

To a 0.3-liter cylindrical glass bomb liner equipped with a thermowell, a 24/40 standard taper cap, and a small aperture, there were charged 3.62 grams of anhydrous cupric acetate, 3.54 grams of anhydrous nickel(II) acetate, 0.177 gram of palladium(II) chloride, and 50 grams of glacial acetic acid. The glass bomb liner and its contents were inserted into a high pressure cylindrical steel bomb equipped with gas inlet and outlet conduits and a thermocouple port. The bomb (and glass liner) then was purged with nitrogen, and heated to 100° C. under a nitrogen atmosphere, with agitation. Ethylene was charged into the bomb to 150 p.s.i.g., followed by agitating the contents of the bomb for a period of 2 hours. Thereafter the bomb was cooled to below 35° C. and vented to atmospheric pressure. The bomb liner was removed, and the resulting reaction product mixture was found to contain a 77 percent yield of vinyl acetate (as determined by vapor phase chromatography with reliable calibration). The bomb liner containing the reduced reaction product is again inserted into the steel bomb, charged with air to 100 p.s.i.g., under agitation, for a period of 0.5 hour at 100° C. Upon examination, the resulting reaction product mixture contains no Pd(O). The cuprous salt is converted to Cu(II). The vinyl acetate content is essentially unchanged. Consequently, the reaction product mixture is recharged with ethylene to 150 p.s.i.g. at 100° C. to give a substantaial additional yield of vinyl acetate.

EXAMPLE 9

In an analogous manner as Example 7 supra, when 36.22 grams of anhydrous cupric acetate, 19.62 grams of anhydrous potassium acetate, 3.05 grams of palladium(II) acetylacetonate, and 500 grams of glacial acetic acid were charged to the bomb and agitated with ethylene at 150 p.s.i.g. and 110° C. for 1 hour there was obtained a yield of 82 percent of vinyl acetate based on Cu(II) and Pd(II).

The product mixture in the bomb is shaken with air at 150 p.s.i.g. and 100° C. for 0.5 hour. After venting, the bomb contents are shaken with ethylene at 150 p.s.i.g. and 110° C for 2 hours to give a substantial additional yield of vinyl acetate.

EXAMPLE 10

In an analogous manner as Example 8 supra, when 3.62 grams of basic feric acetate, 1.96 grams of anhydrous potassium acetate, 1.07 grams of powdered palladium metal, and 50 grams of glacial acetic acid were charged to the bomb, heated to 110° C. and shaken overnight to oxidize Pd(O), then agitated with ethylene at 150 p.s.i.g. and 110° C. for 1 hour. There was obtained a yield of 7 percent of vinyl acetate based on Fe(III).

The product mixture in the bomb is shaken with air at 150 p.s.i.g. and 100° C. for 0.5 hour. After venting, the bomb contents are shaken with ethylene at 150 p.s.i.g. and 110° C for 5 hours to give an additional yield of vinyl acetate.

EXAMPLE 11

In an analogous manner as Example 7 supra, when 36.22 grams of anhydrous cupric acetate, 19.62 grams of anhydrous potassium acetate, 1.77 grams of palladium (II) chloride, 375 grams of glacial acetic acid and 125 grams of N,N-dimethylacetamide were charged to the bomb and agitated with ethylene at 500 p.s.i.g. and 118° C. for 5 hours. There was obtained a yield of 84 percent of vinyl acetate based on Cu(II) and Pd(II).

The product mixture in the bomb is shaken with air at 150 p.s.i.g. and 100° C. for 0.5 hour. After venting, the bomb contents are shaken with ethylene at 500 p.s.i.g. and 120° C for 2 hours to give a substantial additional yield of vinyl acetate

EXAMPLE 12

In an analogous manner as Example 8 supra, when 3.62 grams of anhydrous cupric acetate, 0.177 gram of palladium(II) chloride, and 50 grams of glacial acetic acid were charged to the bomb and agitated with ethylene at 500 p.s.i.g. and 110° C. for 1 hour. There was obtained a yield of 18 percent of vinyl acetate based on Cu(II) and Pd(II).

The product mixture in the bomb is shaken with air at 150 p.s.i.g. and 100° C. for 0.5 hour. After venting, the bomb contents were shaken with ethylene at 500 p.s.i.g. and 110° C for 2 hours to give a substantial additional yield of vinyl acetate.

EXAMPLE 13

In an analogous manner as Example 7 supra, when 36.22 grams of anhydrous cupric acetate, 19.62 grams of anhydrous potassium acetate, 1.77 grams of palladium(II) chloride, and 500 grams of glacial acetic acid were charged to the bomb and agitated with ethylene at 150 p.s.i.g. and 110° C. for 0.25 hour. There was obtained a yield of 100 percent vinyl acetate based on Cu(II) and Pd(II).

The product mixture in the bomb is shaken with air at 150 p.s.i.g. and 110° C. for 0.5 hours. After venting the bomb contents are shaken with ethylene at 150 p.s.i.g. and 110° C. for 0.25 hour to give a substantial additional yield of vinyl acetate.

EXAMPLE 14

In an analogous manner as Example 7 supra, when 36.22 grams of anhydrous cupric acetate, 19.62 grams of anhydrous potassium acetate, 1.77 grams of palladium (II) chloride, 500 grams of glacial acetic acid and 25 grams of purified propionitrile were charged to the bomb and agitated with ethylene at 500 p.s.i.g. and 110° C. for 1 hour. There was obtained a yield of 95 percent of vinyl acetate based on Cu(II) and Pd(II).

The product mixture in the bomb is shaken with air at 150 p.s.i.g. and 110° C. for 0.5 hour. After venting, the bomb contents are shaken with ethylene at 500 p.s.i.g. and 110° C. for 1 hour to give a substantial additional yield of vinyl acetate.

EXAMPLE 15

In an analogous manner as Example 7 supra, when 36.22 grams of anhydrous cupric acetate, 19.62 grams of anhydrous potassium acetate, 1.77 grams of palladium (II) chloride, and 500 grams of glacial acetic acid were charged to the bomb and agitated with ethylene at 1000 p.s.i.g. and 110° C. for 5 hours there was obtained a yield of 100 percent of vinyl acetate based on Cu(II) and Pd(II).

The product mixture in the bomb is shaken with air at 150 p.s.i.g. and 110° C. for 0.5 hour. After venting the bomb contents are shaken with ethylene at 1000 p.s.i.g. and 110° C. for 5 hours to give a substantial additional yield for vinyl acetate.

EXAMPLE 16

In an analogous manner as Example 7 supra, when 36.2 grams of anhydrous cupric acetate, 14.7 grams of anhydrous ammonium acetate, 1.77 grams of palladium dichloride, and 500 grams of glacial acetic acid were charged to the bomb and agitated with ethylene at 500 p.s.i.g. and 91° C. for 1 hour there was obtained a yield of 83 percent of vinyl acetate based on Cu(II) and Pd(II).

The product mixture in the bomb is shaken with air at 150 p.s.i.g. and 90° C. for 0.5 hour. After venting the bomb contents are shaken with ethylene at 500 p.s.i.g. and 90° C. for 1 hour to give a substantial additional yield of vinyl acetate.

EXAMPLE 17

In order to illustrate the effect of ethylene pressure, reaction temperature and acetate ion concentration under certain reaction conditions, a number of experiments were carried out in an analogous manner as Example 7, supra, with the exception that the regeneration of the catalyst mixture with oxygen was omitted for experimental simplicity. Each bomb charge contained 0.2 mole of anhydrous cupric acetate, 0.01 mole of palladium(II) salt and 500 grams of glacial acetic acid. Additional acetate ion concentration was obtained where indicated by the addition of potassium acetate. Temperature and ethylene pressure were varied as indicated; reaction time was 1 hour in every case.

Table I.—*Yield of vinyl acetate as a function of pressure temperature 110°, reaction time 1 hour*

| Ethylene pressure in p.s.i.g.: | Yield, percent |
|---|---|
| 40 | 34 |
| 60 | 30 |
| 100 | 74–82* |
| 150 | 71–99* |
| 500 | 80–100* |

*Range of several runs.

Table II.—Yields of vinyl acetate obtained from bombs run at 500 p.s.i.g. for 1 hour at the indicated potassium acetate concentrations and temperature

| Temp. (° C.) | Added potassium acetate in moles, percent | | |
|---|---|---|---|
| | 0.2 | 0.1 | none |
| 99 | 92 | | |
| 110 | 85 | 45 | 18 |
| 119 | 96 | | |
| 130 | 47 | 29 | 5 |
| 140 | 17 | 17 | 4 |

Table III.—Yield of vinyl acetate obtained from bombs run at 110° for 1 hour at the indicated potassium acetate concentration and ethylene pressure

| Pressure in p.s.i.g. | Added potassium acetate in moles, percent | | |
|---|---|---|---|
| | 0.2 | 0.1 | none |
| 500 | 85 | 45 | 18 |
| 150 | 71 | 26 | 7 |
| 40 | 34 | 37 | 6 |

EXAMPLE 18

A cylindrical stainless steel pressure reactor is charged to capacity with a catalyst mixture containing 33 grams of anhydrous cupric propionate, 23.0 grams of anhydrous ammonium propionate, 3.05 grams of palladium(II) acetylacetonate and 944 grams of propionic acid per kilogram. The temperature of the reactor is controlled at 115–120° C. The pressure of the gase space above the solution in the reactor is maintained at 150 p.s.i.g. by a motor valve operated by a proportional controller.

Propylene and oxygen are sparged separately into the bottom of the reactor at relative rates such that the oxygen content of the gaseous effluent from the catalyst solution remains below the exposive limit. The products, isopropenyl propionate and water are recovered continuously by leading a portion of the reaction solution from the top of the reactor into a still at atmospheric pressure, removing a volatile fraction consisting mainly of isopropenyl propionate and water over head and pumping the remainder of the solution, together with make-up propionic acid back into the bottom of the reactor. Drying and distilling the volatile fraction gives isopropenyl propionate in good yield based on propylene consumed.

EXAMPLE 19

A cylindrical stainless steel pressure reactor is charged to capacity with a catalyst mixture containing 35 grams of anhydrous cupric acetate, 20.0 grams of anhydrous potassium acetate, 3.05 grams of palladium(II) acetylacetonate and 942 grams of glacial acetic acid per kilogram. The temperature of the reactor is controlled at 115–120° C. The pressure of the gas space above the solution in the reactor is maintained at 150 p.s.i.g. by a motor valve operated by a proportional controller.

Ethylene and oxygen are sparged separately into the bottom of the reactor at relative rates such that the oxygen content of the gaseous effluent from the catalyst solution. remains below the exposive limit. The products, vinyl acetate and water are recovered continuously by leading a portion of the reaction solution from the top of the reactor into a still at atmospheric pressure, removing a volatile fraction consisting mainly of vinyl acetate and water over head and pumping the remainder of the solution, together with make-up acetic acid back into the bottom of the reactor. Drying and distilling the volatile fraction gives vinyl acetate in good yield based on ethylene consumed.

EXAMPLE 20

A cylindrical stainless steel pressure reactor is charged to capacity with a catalyst mixture containing 40 grams of anhydrous cupric hexanoate, 30.0 grams of anhydrous potassium hexanoate, 3.05 grams of palladium(II) acetylacetonate and 930 grams of hexanoic acid per kilogram. The temperature of the reactor is controlled at 115°–120° C. The pressure of the gas space above the solution in the reactor is maintained at 150 p.s.i.g. by a motor valve operated by a proportional controller.

Ethylene and oxygen are sparged separately into the bottom of the reactor at relative rates such that the oxygen content of the gaseous effluent from the catalyst solution remains below the explosive limit. The products, vinyl hexanoate and water are recovered continuously by leading a portion of the reaction solution from the top of the reactor into a still maintained at sub-atmospheric pressure, removing a volatile fraction consisting mainly of vinyl hexanoate and water over head and pumping the remainder of the solution, together with make-up hexanoic acid back into the bottom of the reactor. Drying and distilling the volatile fraction gives vinyl hexanoate in good yield based on ethylene consumed.

What is claimed is:

1. A process for producing ethylenically unsaturated hydrocarbyl esters of saturated hydrocarbyl monocarboxylic acids; which comprises providing in an essentially halide free and essentially anhydrous homogeneous liquid phase mixture, an ethylenically unsaturated hydrocarbon free of acetylenic unsaturation, a saturated hydrocarbyl monocarboxylic acid, a catalytic amount of a metallic compound selected from the group consisting of alkanoates, cycloalkane carboxylates and acetylacetonate complexes of metals which are selected from the group consisting of Ir, Au, Rh, Pt, Pd, and Ru, a metallic catalytic co-oxidant selected from the group consisting of alkanoates, ammonium alkanoates, cycloalkane carboxylates and acetylacetonate complexes of metals which are selected from the group consisting of Cu, Fe, Cr, Co, Pb, Ni, Mo, W, V, Mn, Os, the lathanides, and mixtures thereof; the molar ratio of the co-oxidant to the metallic compound being greater than one; and recovering ester from the mixture.

2. The process of claim 1 wherein said co-oxidant is repeatedly contacted with oxygen.

3. A continuous process for producing ethylenically unsaturated hydrocarbyl esters of saturated hydrocarbon monocarboxylic acids; which comprises maintaining in an essentially halide free and essentially anhydrous homogeneous liquid phase mixture, an ethylenically unsaturated hydrocarbon free of acetylenic unsaturation, an alkanoic acid, a catalytic amount of palladium alkanoate, a metallic catalytic co-oxidant comprising cupric alkanoate; the molar ratio of the cupric alkanoate to palladium alkonate being greater than one; repeatedly contacting said co-oxidant with oxygen, and recovering ester from the mixture.

4. The process of claim 3 wherein said alkanoate moiety of both palladium and copper is the same as said alkanoic acid.

5. A process for producing vinyl acetate; which comprises maintaining an essentially anhydrous homogeneous liquid phase mixture essentially free of halide and maintaining in said mixture, ethylene, acetic acid, palladium diacetate, co-oxidant comprising cupric acetate, the molar ratio of cupric acetate to palladium diacetate being greater than one throughout said process, and recovering vinyl acetate from said mixture.

6. The process of claim 5 wherein oxygen is repeatedly introduced to said mixture.

7. The process of claim 5 wherein said co-oxidant is repeatedly contacted with oxygen.

References Cited by the Examiner

UNITED STATES PATENTS

| | | | |
|---|---|---|---|
| 2,006,734 | 7/1935 | Edlund et al. | 260—497 |
| 2,320,063 | 5/1943 | Borkowski et al. | 252—430 |
| 2,496,353 | 2/1950 | Moore | 252—430 |
| 2,497,408 | 2/1950 | Gresham | 260—497 |
| 2,541,680 | 2/1951 | Vesterdal | 252—416 |
| 2,739,169 | 3/1956 | Hagemeyer | 260—497 |

FOREIGN PATENTS

| | | |
|---|---|---|
| 614,970 | 9/1962 | Belgium. |
| 137,511 | 4/1960 | U.S.S.R. |

OTHER REFERENCES

Moiseev et al.: "Proceedings of the Academy of Sciences," U.S.S.R., pages 801 to 804.

Smidt: Chemistry and Industry, Jan. 13, 1962, pp. 54–61.

LORRAINE A. WEINBERGER, *Primary Examiner.*

TOBIAS E. LEVOW, HAROLD G. MOORE, *Examiners.*